E. F. SHUSTER.
WIRE STRAIGHTENING AND CUTTING-OFF MACHINE.
APPLICATION FILED NOV. 13, 1911.
1,030,930.
Patented July 2, 1912.
2 SHEETS—SHEET 1.
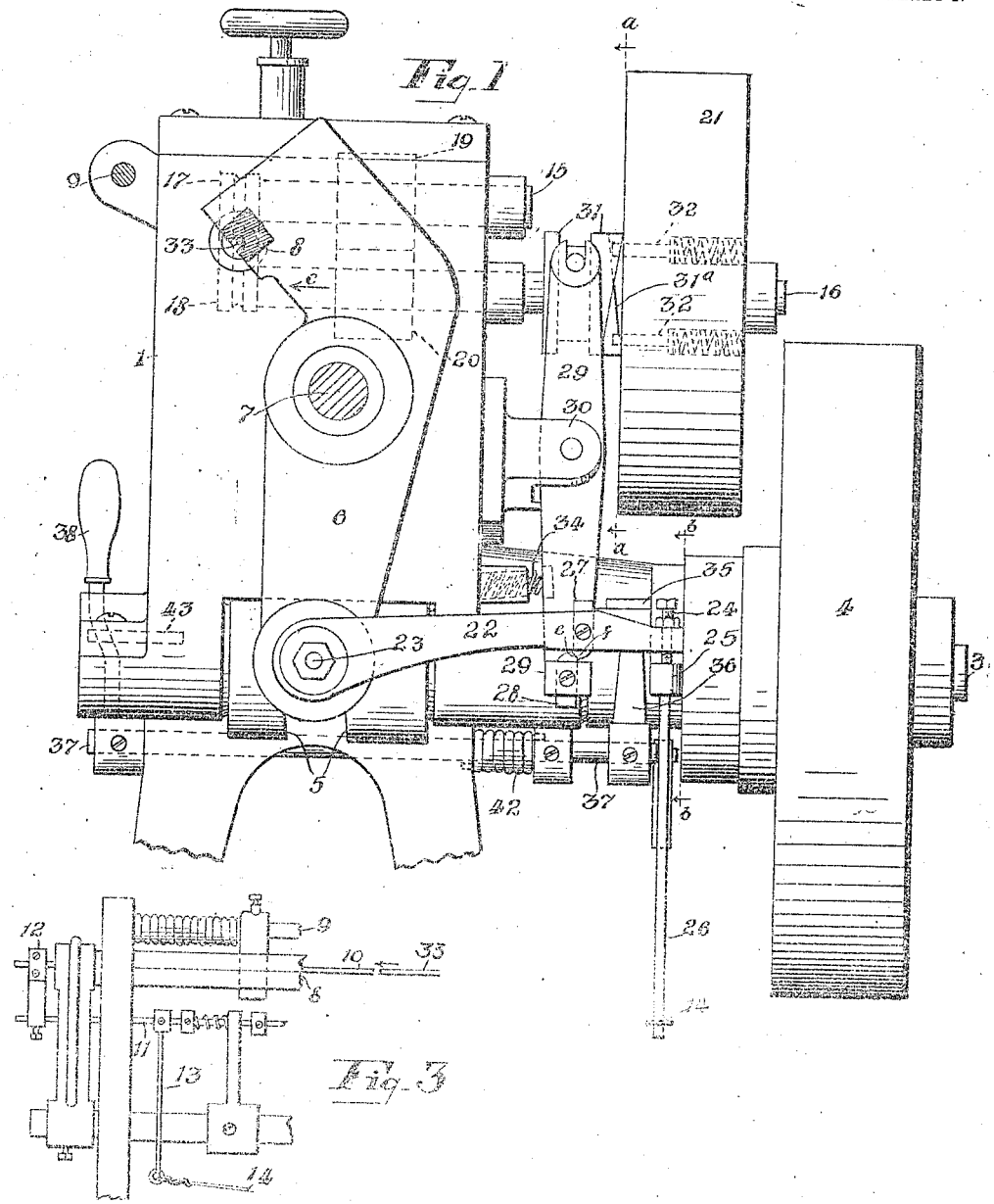

E. F. SHUSTER.
WIRE STRAIGHTENING AND CUTTING-OFF MACHINE.
APPLICATION FILED NOV. 13, 1911.
1,030,930.
Patented July 2, 1912.
2 SHEETS—SHEET 2.
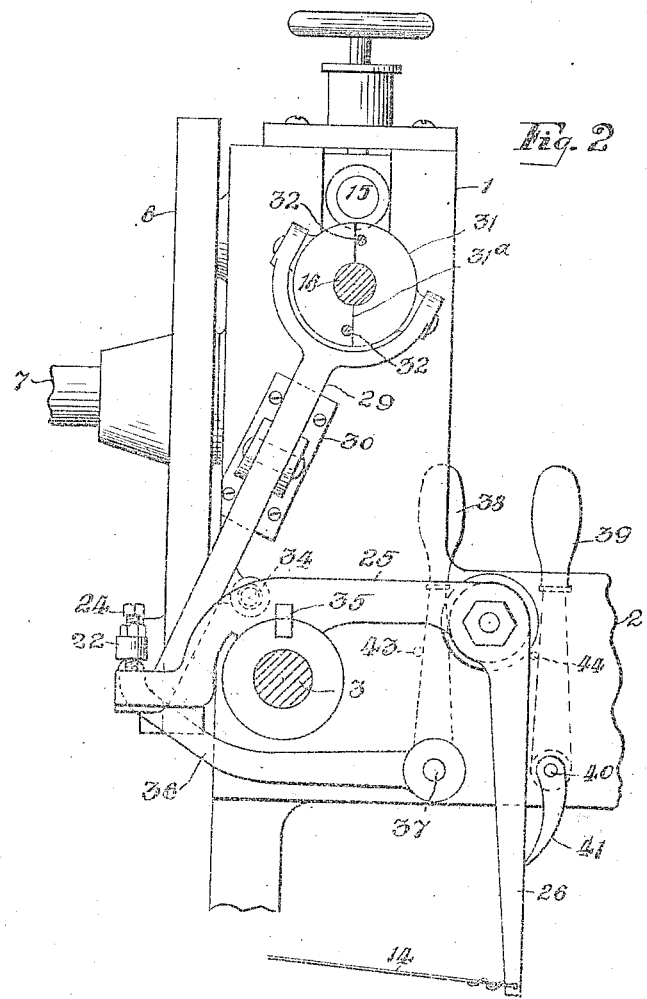
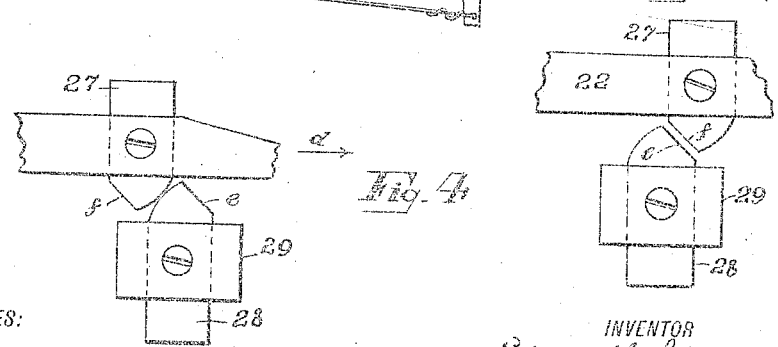
WITNESSES:
H. J. Lamb
F. H. Beckwith
INVENTOR
Elmore F. Shuster
BY Geo. D. Phillips
his ATTORNEY

UNITED STATES PATENT OFFICE.

ELMORE F. SHUSTER, OF NEW HAVEN, CONNECTICUT.

WIRE STRAIGHTENING AND CUTTING-OFF MACHINE.

1,030,930. Specification of Letters Patent. Patented July 2, 1912.

Application filed November 13, 1911. Serial No. 659,936.

*To all whom it may concern:*

Be it known that I, ELMORE F. SHUSTER, citizen of the United States, residing at New Haven, in the county of New Haven and State of Connecticut, have invented certain new and useful Improvements in Wire Straightening and Cutting-Off Machines; and I do hereby declare the following to be a full, clear, and exact description of the invention, such as will enable others skilled in the art to which it appertains to make and use the same.

My invention relates to improvements in wire straightening and cutting-off machines, and particularly to means for actuating the cutting-off and feed-roll mechanism.

Referring to the drawings wherein the same figures and letters of reference indicate like parts throughout the several views: Figure 1 represents a front elevation of the machine; broken view of the machine legs, sectional view of the rock shaft, guide bar and guide bar apron rod; Fig. 2 is a side elevation of the head of the machine; broken view of the bed and legs, sectional view of one of the feed roll shafts on line $a$ of Fig. 1, and of the cutting off lever shaft on line $b$; Fig. 3 is a reduced broken side elevation of the forward end of the machine; Fig. 4 is an enlarged broken view of the trip lever and end view of the feed roll shift lever; and, Fig. 5 is a similar view except that the trip dogs are in a different position.

A brief description of the well known parts of the machine may be necessary for a proper understanding of my improved features and the relation they have thereto.

1 is the machine head, 2 the bed, 3 the cam shaft journaled in the bed, 4 continuously running balance wheel pulley on said shaft, 5 cam on said shaft for actuating the cutting off lever 6 secured to the shaft 7 carrying the guide bar 8. 9, guide bar apron rock shaft. 10 gage rod. 11, trip rod connected to the gage rod by the clamp 12. 13 is a finger secured to the trip rod and its lower end connected to the trip wire 14. 15 and 16 are the feed roll shafts carrying the feed rolls 17 and 18. 19 and 20 are gears rotatably connecting said feed roll shafts. 21 is a continuously running balance wheel pulley mounted on the feed roll shaft 16.

The improved features comprise the trip lever 22 journaled on the cam roll pin 23 secured to and projecting from the lower end of the cutting off lever 6. The forward end of this trip lever carries the adjusting screw 24 normally resting on the horizontal arm 25 of the clutch lever, whose depending arm 26 connects with the trip wire 14. The trip lever 22 carries the dog 27 adapted to engage with the dog 28 of the shift lever 29 pivotally supported in the bracket 30. The upper end of this lever is pivotally connected to sliding clutch sleeve 31 on the feed roll shaft 16, whose outer clutch face 31ª is adapted to be engaged by the spring actuated driving pins 32 carried by the balance wheel 21.

When the end of the incoming wire 33, in the guide bar 8 (Fig. 1), contacts with the end of the gage rod 10 (Fig. 3), the trip wire 14 will be pulled to actuate the depending arm 26 of the clutch lever and thereby raise the horizontal arm 25 of said lever a distance sufficient to disengage the dogs 27 and 28, and when thus disengaged the spring 34, acting against the lower end of the shift lever 29, will cause the upper end of said lever to move in the opposite direction and carry the clutch sleeve 31 out of contact with the driving pins 32 and bring the feed rolls to a standstill.

While the movement of the clutch lever simultaneously releases the key 35 and places it under the influence of a spring (not shown) to carry it into engagement with the balance wheel 4 and start the rotation of the shaft 3 to actuate the cutting off lever 6, and also the shift lever 29, the movement of the shift lever must necessarily act before the cutting off lever, and preferably so, as it is important that the feed rolls should stop before the cutting off lever can sever the wire. Tripping the shift lever will place the dogs 27 and 28 in the position shown at Fig. 4, and when the cutting off lever moves in the direction of arrow $c$ to cut off a section of wire, the trip lever will move in the direction of arrow $d$ and place its dog on the opposite side of the dog of the shift lever as shown at Fig. 5, and when the cutting off lever is returning to its normal stationary position, the taper faces $e$ and $f$ of the dogs will be engaged and the trip lever will actuate the upper end of the shift lever toward the balance wheel pulley 21 to reëngage the clutch sleeve therewith, and the various parts will be in the position shown at Fig. 1.

To manually stop the feed rolls and start the cutting off mechanism to sever a bad end of the wire or cut off a piece shorter than that for which the gage rod is set, I have provided the hand tripping lever 36 secured to the rotatable shaft 37 with its free end underlying the trip lever 22. The shaft 37 is turned to release the engagement of the levers 22 and 29 through the medium of the handle lever 38 to stop the feed rolls, while the clutch lever is manually actuated to set the cutting off lever in motion through the medium of the handle lever 39, shaft 40 and trip lever 41 contacting with the vertical arm 26 of the clutch lever. 42 is a torsional spring on shaft 37 for returning the handle lever 38 to its normal position against the stop pin 43. A similar spring (not shown) is employed on shaft 40 to return the handle lever 39 against the stop pin 44.

Having thus described my invention, what I claim is:

1. In a machine of the character described, the combination with the cam shaft carrying a continuously running balance-wheel pulley, a clutch lever associated therewith, a cutting-off lever actuated by said shaft, feed rolls, shafts therefor, a continuously running balance-wheel pulley and a clutch sleeve on one of said feed-roll shafts, guide bar, gage rod and trip rod mechanism, and a trip wire connecting the trip rod mechanism with the clutch lever of the cam shaft, of a pivotally supported trip lever movable with the cutting-off lever with its free end normally supported on the clutch lever, a pivotally supported spring-actuated shift lever connecting the clutch on the feed-roll shaft with the trip lever carried by the cutting-off lever, and means for detachably connecting said trip lever with the shift lever, so that, when the clutch lever is actuated, it will lift the trip lever and release the shift lever to stop the feed rolls and, through the medium of the cam shaft, the cutting-off lever is actuated to sever a section of wire, and on the return movement of the cutting-off lever the trip lever will engage the shift lever and bring it into position for restarting the feed rolls.

2. In a machine of the character described comprising a cam shaft, a clutch lever associated therewith, a cutting-off lever actuated by said shaft, a pivotally supported trip lever movable with the cutting-off lever with its free end normally supported on the clutch lever, feed rolls and shafts therefor, a continuously running balance-wheel pulley and a sliding clutch sleeve mounted on one of the feed-roll shafts, and a pivotally supported spring-actuated shift lever having one of its ends connected with the sliding clutch and its opposite end detachably connected with the trip lever.

3. In a machine of the character described, a cam shaft, a clutch lever associated therewith, a cutting-off lever actuated by the shaft, and a pivotally supported trip lever movable with the cutting-off lever and adapted to be actuated by the clutch lever.

4. In a machine of the character described comprising a cam shaft, a clutch lever associated therewith, a cutting-off lever actuated by the shaft, a pivotally supported trip lever movable with the cutting-off lever and adapted to be actuated by the clutch lever, means for manually actuating the trip lever independently of the clutch lever, and means for manually actuating the clutch lever to actuate the trip lever.

In testimony whereof I affix my signature in presence of two witnesses.

ELMORE F. SHUSTER

Witnesses:
E. L. SIMPSON,
J. OLSON.